(12) United States Patent
Rohde

(10) Patent No.: US 7,278,302 B2
(45) Date of Patent: Oct. 9, 2007

(54) METHOD FOR THE TESTING OF EXHAUST GAS TURBOCHARGERS

(75) Inventor: Christian Rohde, Bremen (DE)

(73) Assignee: Johann A. Krause Maschinenfabrik GmbH, Bremen (DE)

( * ) Notice: Subject to any disclaimer, the term of this patent is extended or adjusted under 35 U.S.C. 154(b) by 0 days.

(21) Appl. No.: 11/070,896

(22) Filed: Mar. 2, 2005

(65) Prior Publication Data

US 2006/0196256 A1 Sep. 7, 2006

(51) Int. Cl.
G01M 15/00 (2006.01)
(52) U.S. Cl. .................................................. 73/118.1
(58) Field of Classification Search ................. 73/112, 73/115, 116, 117.2, 117.3, 118.1, 118.2, 119 R
See application file for complete search history.

(56) References Cited

U.S. PATENT DOCUMENTS

| | | | | |
|---|---|---|---|---|
| 4,277,830 A * | 7/1981 | Reid et al. | ...................... | 701/99 |
| 4,334,427 A * | 6/1982 | Armstrong | ................. | 73/118.1 |
| 4,356,725 A * | 11/1982 | Armstrong | ................. | 73/118.1 |
| 4,694,689 A * | 9/1987 | Kawasaki | .................. | 73/118.1 |
| 5,355,713 A * | 10/1994 | Scourtes et al. | ........... | 73/117.2 |
| 5,705,742 A * | 1/1998 | Fox et al. | ...................... | 73/116 |
| 5,780,730 A * | 7/1998 | Scourtes et al. | ........... | 73/117.2 |
| 6,250,145 B1 * | 6/2001 | Honold et al. | ............ | 73/119 R |
| 6,298,718 B1 * | 10/2001 | Wang | ........................ | 73/118.1 |
| 6,499,299 B2 * | 12/2002 | Propernick | .................... | 60/602 |
| 6,543,227 B2 * | 4/2003 | He et al. | ....................... | 60/602 |
| 6,717,282 B1 * | 4/2004 | Maxwell | .................. | 290/40 R |
| 6,785,604 B2 * | 8/2004 | Jacobson | ..................... | 701/114 |
| 2002/0148224 A1 * | 10/2002 | Propernick | ................... | 60/606 |
| 2003/0216856 A1 * | 11/2003 | Jacobson | ..................... | 701/114 |

FOREIGN PATENT DOCUMENTS

| EP | 0 464 822 A1 | 1/1992 |
|---|---|---|
| JP | 10196383 A | 7/1998 |

* cited by examiner

*Primary Examiner*—Eric S. McCall
(74) *Attorney, Agent, or Firm*—Laurence P. Colton; Smith, Gambrell & Russel

(57) ABSTRACT

The method according to the invention provides for an internal combustion engine (11) driven in trailing mode to generate compressed air for driving the turbine (12) of the exhaust-gas turbocharger (10) to be tested. It is thereby possible to carry out the cold testing of the exhaust-gas turbocharger (10) together with that internal combustion engine (11) with which the exhaust-gas turbocharger (10) is subsequently operated. Furthermore, there is provision, in the method, for throttling the air on the delivery side of the compressor (13). The compressor (13) can thereby be operated under load in the turbine characteristic diagram during the cold test. Thus, further measurement quantities can be determined which make it possible to determine the characteristic of the exhaust-gas turbocharger (10) to be tested in the cold test.

32 Claims, 1 Drawing Sheet

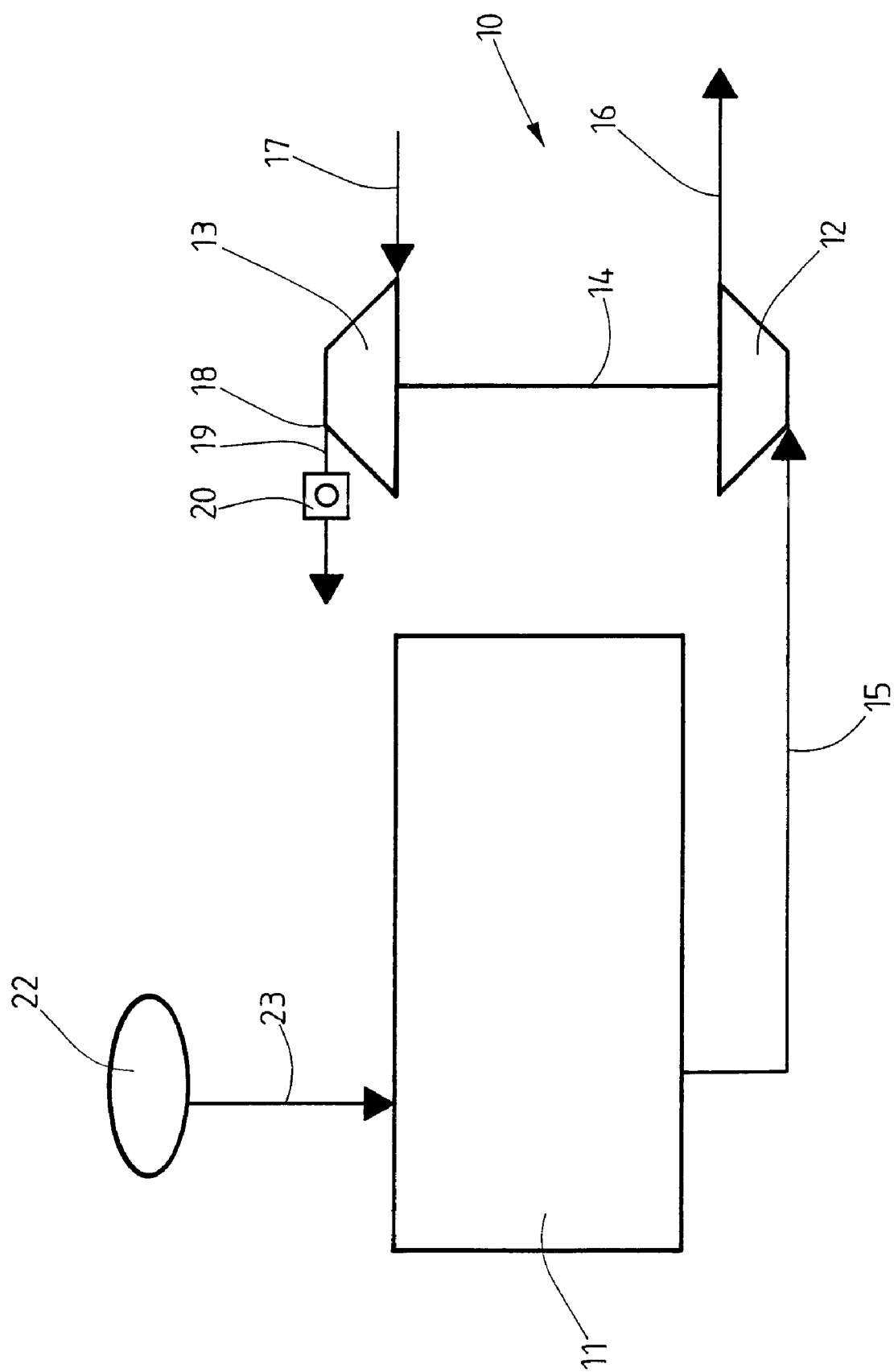

METHOD FOR THE TESTING OF EXHAUST GAS TURBOCHARGERS

BACKGROUND OF THE INVENTION

1. Technical Field

The invention relates to a method for the testing of turbochargers in which a turbine of the respective exhaust-gas turbocharger is driven by means of air which is under pressure, and the test being carried out at least with the inclusion of measurement quantities on the compressor of the respective turbocharger, or in which a turbine of the respective exhaust-gas turbocharger is driven by means of compressed air, and the test being carried out with the inclusion of at least measurement quantities determined on the respective exhaust-gas turbocharger.

2. Prior Art

The invention entails testing exhaust-gas turbochargers by what is known as cold testing. In this respect, it is already known to operate the turbine of the exhaust-gas turbocharger not with hot combustion air from an internal combustion engine, but with compressed air which is at ambient temperature. In known cold tests of exhaust-gas turbochargers, for this purpose, the turbine is driven with compressed air, specifically at a low rotational speed outside the turbine characteristic diagram. The compressor in this case runs empty, that is to say does not generate any compressed air on the delivery side. In this known cold test, the exhaust-gas turbocharger is not to be tested under load. In practice, therefore, only a mechanical running test can take place. Since, in the known cold test, the exhaust-gas turbocharger cannot be operated in the turbine characteristic diagram, its performance and operating characteristic cannot be determined. This is a disadvantage, above all, when, as in V-type internal combustion engines with a plurality of exhaust-gas turbochargers, it is customary to assign an exhaust-gas turbocharger to each cylinder bank, that is to say the internal combustion engine has two exhaust-gas turbochargers. The two exhaust-gas turbochargers are to be capable of being operated as synchronously as possible. Even where basically identical exhaust-gas turbochargers are concerned, their efficiencies and operating characteristics differ from one another on account of various influences, in particular tolerances. The different operating characteristics of exhaust-gas turbochargers which are identical per se do not permit synchronous running. The aim, therefore, is to select for an internal combustion engine having a plurality of exhaust-gas turbochargers those exhaust-gas turbochargers which have virtually the same characteristics. For this purpose, in the cold test, the operating behavior of each exhaust-gas turbocharger must be capable of being tested, which known cold tests of the type initially described do not permit.

Proceeding from this, the object on which the invention is based is to provide a method for the testing of exhaust-gas turbochargers, whereby even measurement quantities of loaded exhaust-gas turbochargers can be detected in the cold test.

BRIEF SUMMARY OF THE INVENTION

A method for achieving this object a method for the testing of exhaust-gas turbochargers in which a turbine of the respective exhaust-gas turbocharger is driven by means of air which is under pressure, and the test being carried out at least with the inclusion of measurement quantities on the compressor of the respective turbocharger, characterized in that the pressure of the air is generated at least partially by an internal combustion engine driven in trailing mode. Since the pressure of the air for driving the turbine of the or each exhaust-gas turbocharger is generated at least partially by an internal combustion engine driven in trailing mode, the cold test of the exhaust-gas turbocharger can be simulated near to reality, in particular in the turbine characteristic diagram. It is thus possible, in particular, to compare measurement quantities which have been determined on the exhaust-gas turbocharger driven in trailing mode with corresponding, preferably simultaneously determined measurement quantities of the likewise cold-driven trailing internal combustion engine. This applies particularly when, according to a preferred refinement of the method, that internal combustion engine is driven in trailing mode with which the exhaust-gas turbocharger or else a plurality of exhaust-gas turbochargers in the case of what are known as bi-turboengines cooperate in subsequent operation.

The cold test on the exhaust-gas turbocharger (or in the case of bi-turboengines) of the two exhaust-gas turbochargers can take place by means of air which is under pressure which is generated solely by the internal combustion engine driven in trailing mode. It is also conceivable, however, to supply the intake tract of the internal combustion engine driven in trailing mode with air which is already under some pressure and the pressure of which is increased in the driven internal combustion engine, so that cold air having a relatively high pressure is available for the cold testing of the respective exhaust-gas turbocharger. With both alternative types of operation, the cold testing of the respective exhaust-gas turbocharger can be carried out more advantageously than was possible in known cold tests. Particularly with regard to this supply of air which is under pressure to the internal combustion engine, the respective exhaust-gas turbocharger can be tested by means of air (compressed air) which is under a relatively high pressure, with the result that the cold test can be conducted relatively near to practical conditions, specifically at turbine rotational speeds of the exhaust-gas turbocharger to be tested in each case of up to 100,000 revs/min.

A further method for achieving the object initially mentioned is a method for the testing of exhaust-gas turbochargers in which a turbine of the respective exhaust-gas turbocharger is driven by means of compressed air, and the test being carried out with the inclusion of at least measurement quantities determined on the respective exhaust-gas turbocharger, characterized in that the air is throttled on a delivery side of the compressor. Since the air is throttled on the delivery side of the compressor, an air build-up occurs on the delivery side and leads to an increase in the pressure of the air. The result is that the exhaust gas-turbocharger runs under load during the cold test, because the turbine is operating, to be precise is compressing air. In contrast to the cold testing of turbochargers according to the prior art, it is thus possible, even on the compressor of the exhaust-gas turbochargers to be tested in the cold test, to determine measurement quantities which conform, close to reality, to the true operation of the exhaust-gas turbochargers.

The throttling of the air on the delivery side of the respective compressor takes place by means of an arrangement of a throttle on or downstream of the delivery side of the compressor, said arrangement being for the purpose of the cold test. This gives rise, between the delivery side of the compressor and the throttle, to a measurement section in which the required transmitters of the measuring instruments can be adapted. The throttle also makes it possible that the air can emerge into the open downstream of the latter. The air of the section up to the throttle nevertheless has an increased pressure which permits measurements because the compressor is operating, to be precise can compress air. The free discharge of the air downstream of the throttle makes it unnecessary to connect the compressor of the exhaust-gas turbocharger to the intake side of the internal combustion engine for the cold test.

Either an external compressed air source may serve or compressed air occurring on the exhaust-gas side of an internal combustion engine driven in trailing mode may be used for driving the turbine of the exhaust-gas turbocharger to be tested in each case. The pressure of this compressed air may be increased, if appropriate, by the supply of air which is under pressure to the intake tract of the internal combustion engine driven in trailing mode. Said alternatives for supplying compressed air to the turbine of the exhaust-gas turbocharger to be tested make it possible, on account of the throttle on the delivery side of the compressor, to test the latter, as it were under load, in the cold test.

According to a preferred development of the method, the measurement quantities, in particular the final compression pressure (boost pressure), to be determined on the compressor of the exhaust-gas turbocharger to be tested in each case are determined between the delivery side of the compressor and the throttle. The measurement quantities can be determined here under conditions close to reality, and at the same time the measurement quantity transducers required for measurement can be adapted quickly and simply.

Preferably, the measurement quantities determined during the cold testing of the respective exhaust-gas turbocharger are the final compression pressure (boost pressure), the compressor mass airflow, the internal combustion engine mass airflow, the intake pressure of the internal combustion engine, the exhaust-gas turbocharger rotational speed, the internal combustion engine rotational speed and/or the temperatures of the compressed air and/or of the oil. Said measurement quantities are determined jointly, or if appropriate, also only partially. In this case, the methods according to the invention ensure that measurement quantities close to reality and having evidential force are determined, specifically, in particular, because the methods according to the invention make it possible to test (cold) in the turbine characteristic diagram the or each exhaust-gas turbocharger to be tested in the cold test.

There is provision, furthermore, for determining characteristic values of the respective exhaust-gas turbocharger from ratios of the measurement quantities determined during the cold test. These are preferably the ratio of the compressor mass airflow to the internal combustion engine mass airflow, the ratio of the boost pressure to the internal combustion engine mass airflow, the ratio of the compressor mass airflow to the rotational speed of the exhaust-gas turbocharger and/or the ratio of the boost pressure to the exhaust-gas turbocharger rotational speed. Even in the case of exhaust-gas turbochargers tested in the cold state, these characteristic values permit evidential statements as to their functioning, power, efficiency and/or boost pressure characteristic, which, although the measurement quantities have been recorded in the simulated cold test, are identical to or at least comparable to the given conditions when the respective exhaust-gas turbocharger is operating in practice.

The methods according to the invention can preferably also be used for the simultaneous testing of two exhaust-gas turbochargers which are assigned to a common internal combustion engine (bi-turbocharger). In bi-turbochargers, the synchronous running of the individual exhaust-gas turbochargers is particularly important. This can be achieved only with difficulty in practice because of manufacture-related influences, in particular tolerances. For an internal combustion engine requiring two exhaust-gas turbochargers, therefore, those exhaust-gas turbochargers are selected which have an identical or approximate characteristic. Especially the cold test by the methods according to the invention is suitable for this purpose, because it is possible, on the basis of the determined measurement quantities of characteristic values, to deduce whether the exhaust-gas turbochargers have properties which operate in common on the internal combustion engine, in particular imply good synchronization. If appropriate, when it becomes apparent during the cold test that the two tested exhaust-gas turbochargers have different characteristics, a matching pair of exhaust-gas turbochargers having as identical characteristics as possible can be determined, if appropriate, by means of the multiple exchange of at least one exhaust-gas turbocharger.

BRIEF DESCRIPTION OF THE DRAWING

A preferred exemplary embodiment of the method according to the invention is explained in more detail below by means of the drawing. The single FIGURE of the drawing shows basically a circuit diagram of an exhaust-gas turbocharger to be tested, together with the associated internal combustion engine.

DETAILED DESCRIPTION OF THE PREFERRED EMBODIMENTS

The exemplary embodiment of the invention shown in the figure relates to the testing of a (single) exhaust-gas turbocharger 10 which is assigned to an internal combustion engine 11. The internal combustion engine 11 may be both a gasoline engine and a diesel engine. Preferably, an internal combustion engine 11 is used which is built together with the exhaust-gas turbocharger 10. The exhaust-gas turbocharger 10 is therefore tested on that internal combustion engine 11 with which the exhaust-gas turbocharger 10 is also operated subsequently. In what is known as the cold test, the exhaust-gas turbocharger 10 is tested by means of compressed air having ambient temperature. In this case, the internal combustion engine 11 is driven in trailing mode, that is to say, during the cold testing of the exhaust-gas turbocharger 10, is likewise operated in the cold unfueled state.

The exhaust-gas turbocharger 10 has a turbine 12 which drives a compressor 13. For this purpose, the compressor 13 is coupled directly to the turbine 12, preferably via a drive shaft 14 connecting the turbine 12 to the compressor 13.

The internal combustion engine 11 is connected to the inlet side of the turbine 12 via a compressed air line 15. The compressed air line 15 starts from the exhaust tract of the internal combustion engine 11. Preferably, the compressed air line 15 is connected to the exhaust manifold of the internal combustion engine 11. The compressed air serving for driving the turbine 12 of the exhaust-gas turbocharger 10 to be tested is expanded during the drive of the turbine 12 and passes into the open via the outlet of the turbine 12. This emergence of the air expanded in the turbine 12 is symbolized by an arrow 16 in the drawing.

The compressor 13 sucks in ambient air on its inlet side. This is symbolized by an arrow 17 in the figure. The compressor 13 driven by the turbine 12 via the drive shaft 14 compresses the sucked-in air. The compressed air thereafter leaving the compressor 13 on a delivery side 18 is conducted to a throttle 20 via a connecting line 19 emanating from the delivery side 18 of the compressor 13. The throttle 20 is, in the simplest instance, a perforated diaphragm with a hole diameter of between 5 mm and 15 mm. Preferably, the hole diameter is 10 mm to 11 mm. Downstream of the throttle 20, the air is discharged into the open in the direction of the arrow 21.

By virtue of the throttle 20, the compressor 13 operates under load, in spite of the discharge of air into the open, because the throttle 20 gives rise to an excess pressure in the connecting line 19. The compressor 13 must generate this excess pressure so that it operates under operating conditions (under load) during the cold testing of the exhaust-gas turbocharger 10. The connecting line 19 between the air outlet on the delivery side 18 of the compressor 13 and the throttle 20 is suitable for the application of measurement value transducers for determining measurement quantities on the delivery side 18 of the compressor 13.

The method according to the invention proceeds as follows:

Sucked-in ambient air is compressed by the unfueled internal combustion engine 11 driven in trailing mode. For safety reasons, during the cold testing of the exhaust-gas turbocharger 10, the internal combustion engine is driven at a maximum of 3000 rev/min. The compressed air occurring on the exhaust-gas side of the internal combustion engine 11 owing to its trailing drive passes via the exhaust manifold of the internal combustion engine 11 and the compressed air line 15 to the inlet of the turbine 12 of the exhaust-gas turbocharger 10 to be cold-tested. The compressed air coming from the internal combustion engine 11 in this case drives the turbine 12, specifically at a rotational speed of up to 100,000 rev/min. The exhaust-gas turbocharger 10 in this case operates in what is known as the turbine characteristic diagram. The air expanded during the drive of the turbine 12 escapes, essentially pressureless, from the turbine 12. The turbine driven by the compressed air drives, via the drive shaft 14, the compressor 13. The latter in this case sucks in pressureless ambient air on the intake side and compresses this. The air which is thereby compressed and is under pressure flows via the connecting line 19 to the throttle 20 and escapes into the open downstream of the throttle 20. The throttle 20 essentially maintains the pressure, generated by the compressor 13, of the air in the connecting line 19, and measurements of the air compressed by the compressor 13 operating in the turbine characteristic diagram can take place in the connecting line 19.

An external compressed air source 22 is also indicated in the figure of the drawing. The external compressed air source 22 delivers air which is under pressure and which is conducted via a connecting line 23 to the intake track, preferably to the intake manifolds, of the internal combustion engine 11. If required or desired for the cold test, the air precompressed by the compressed air source 22 serves for charging the internal combustion engine 11. As a result, the air mass flowing through the internal combustion engine 11 and subsequently through the turbine 12 is increased. This results in a further increase in the rotational speed of the exhaust-gas turbocharger 10. It is also conceivable, however, to carry out the cold testing of the exhaust-gas turbocharger 10, without fully precompressed air being supplied to the internal combustion engine 11 on the intake side. In this procedure, the internal combustion engine 11 sucks in pressureless ambient air.

In the cold test on the exhaust-gas turbocharger 10 with an internal combustion engine 11 driven in a trailing mode up to a maximum rotational speed of 3,000 rev/min and with a generated rotational speed of the turbine 12 of up to 100,000 rev/min, the following measurement quantities are detected: exhaust-gas turbocharger rotational speed, internal combustion engine rotational speed, compressor mass airflow, internal combustion engine mass airflow, boost pressure of the exhaust-gas turbocharger 10, intake pressure of the internal combustion engine 11 and the temperature of the air and of the oil. Not all the measurement quantities mentioned necessarily have to be detected, and it may be sufficient, if appropriate, to detect only some of these measurement quantities mentioned.

The compressor mass airflow is determined by means of an air mass meter which is adapted on the suction side (arrow 17) of the compressor 13. The boost pressure in the compressor 13 is determined, upstream of the throttle 20, on the delivery side 18 of the compressor 13. The exhaust-gas turbocharger rotational speed is determined by means of the rotational speed of the turbine 12.

Characteristic values are determined from said measurement quantities for the cold testing of the exhaust-gas turbocharger 10. These characteristic values are the ratio of the compressor mass airflow to the internal combustion engine mass airflow, the ratio of the boost pressure to the internal combustion engine mass airflow, the ratio of the compressor mass airflow to the rotational speed of the exhaust-gas turbocharger 10 and the ratio of the boost pressure to the rotational speed of the exhaust-gas turbocharger 10. Here, too, it may be sufficient, where appropriate, if only some of the said characteristic values are calculated from the measurement quantities.

In an internal combustion engine, not shown in the drawing, with two exhaust-gas turbochargers (bi-turbo), two exhaust-gas turbochargers assigned to the internal combustion engine are subjected to the cold test simultaneously. In this case, each of the two cylinder banks of the internal combustion engine is assigned an exhaust-gas turbocharger. Each exhaust-gas turbocharger is supplied from the exhaust tract to a cylinder bank with compressed air generated in the internal combustion engine driven in trailing mode.

In the simultaneous cold testing of both exhaust-gas turbochargers of a bi-turbo internal combustion engine, not only are the measurement quantities and characteristic values determined initially in connection with the cold test of an exhaust-gas turbocharger 10 detected and evaluated; on the contrary, the characteristics of both exhaust-gas turbochargers are determined on the basis of these measurement quantities and characteristic values and compared with one another. This comparison is carried out in terms of identical or virtually identical characteristics of both exhaust-gas turbochargers.

If it becomes apparent during the cold test that the two tested exhaust-gas turbochargers have excessive deviations with regard to their characteristics, at least one exhaust-gas turbocharger is exchanged for another exhaust-gas turbocharger and the cold test is then repeated. The cold test is conducted as often as is necessary until two exhaust-gas turbochargers with the same or approximately the same characteristic are found, of which it can be assumed that they can be synchronized with sufficient accuracy during the subsequent operation of the internal combustion engine.

| List of reference symbols | |
| --- | --- |
| 10 | Exhaust-gas turbocharger |
| 11 | Internal combustion engine |
| 12 | Turbine |
| 13 | Compressor |
| 14 | Drive shaft |

-continued

| | List of reference symbols |
|---|---|
| 15 | Compressed air line |
| 16 | Arrow |
| 17 | Arrow |
| 18 | Delivery side |
| 19 | Connecting line |
| 20 | Throttle |
| 21 | Arrow |
| 22 | Compressed air source |
| 23 | Connecting line |

What is claimed is:

1. A method for the testing of exhaust-gas turbochargers (10) in which a turbine (12) of the respective exhaust-gas turbocharger (10) is driven by means of air which is under pressure, and the testing being carried out with the inclusion of measurement quantities on the compressor (13) of the respective exhaust-gas turbocharger (10), comprising the steps of:
a) generating the pressure of the air which is under pressure at least partially by an internal combustion engine (11) driven in trailing mode;
b) providing a throttle on or downstream of a delivery side of the compressor (13); and
c) using a boost pressure between the delivery side of the compressor (13) and the throttle as the measurement quantity of the compressor which is to be determined.

2. The method as claimed in claim 1, characterized in that, in the internal combustion engine (11) driven in trailing mode, the air which occurs on the exhaust-gas side and is under pressure is used for driving the turbine (12) of the exhaust-gas turbocharger (10) to be tested in each case.

3. The method as claimed in claim 1, characterized in that air which is under pressure is supplied to an intake tract of the internal combustion engine (11), the pressure of the air sucked in by the internal combustion engine (11) is increased in the internal combustion engine (11) driven in trailing mode, and the air which thereafter flows out of the respective exhaust tract of the internal combustion engine (11) and is under pressure is used for driving the turbine (12) of each exhaust-gas turbocharger (10) to be tested.

4. The method as claimed in claim 1, characterized in that the or each exhaust-gas turbocharger (10) is tested by means of that trailing internal combustion engine (11) to which the or each exhaust-gas turbocharger (10) is assigned during the subsequent operation of the internal combustion engine (11).

5. The method as claimed in claim 1, characterized in that the air is discharged into the surroundings downstream of the throttle (20), as seen in the direction of flow.

6. The method as claimed in claim 1, characterized in that air, which is under pressure, from an external compressed air source (22) is used solely or additionally for driving the turbine (12) of the or each exhaust-gas turbocharger (10) to be tested.

7. The method as claimed in claim 1, characterized in that compressed air emerging at the exhaust tract of the internal combustion engine (11) driven in trailing mode is used for driving each exhaust-gas turbocharger (10) to be tested.

8. The method as claimed in claim 1, characterized in that the intake tract of the driven internal combustion engine (11) is acted upon by air which is under pressure, the pressure of this air is increased in the internal combustion engine (11) driven in trailing mode, and the air of increased pressure which thereby emerges from the internal combustion engine (11) at the exhaust tract is used for driving the turbine (12) of the or each exhaust-gas turbocharger (10) to be tested.

9. The method as claimed in claim 1, characterized in that measurement quantities of the compressor (13) are determined.

10. The method as claimed in claim 1, characterized in that, in addition to the boost pressure, the compressor mass airflow, the internal combustion engine mass airflow, the intake pressure of the internal combustion engine (11), the rotational speed of the exhaust-gas turbocharger (10), the rotational speed of the internal combustion engine (11) and/or the temperature of the air and/or of the oil are measured.

11. The method as claimed in claim 1, characterized in that a plurality of, preferably two, exhaust-gas turboohargers (10) assigned to the internal combustion engine (11) are tested simultaneously on the internal combustion engine (11) driven in trailing mode.

12. The method as claimed in claim 1, characterized in that characteristic values of the exhaust-gas turbocharger (10) to be tested in each case are determined from the measurement quantifies determined during the cold test.

13. The method as claimed in claim 12, characterized in that the characteristic values of the respective exhaust-gas turbocharger (10) are determined from the ratios of the compressor mass airflow to the internal combustion engine mass airflow, the ratio of the boost pressure to the internal combustion engine mass airflow, the ratio of the compressor mass airflow to the rotational speed of the exhaust-gas turbocharger (10) and/or the ratio of the boost pressure to the rotational speed of the exhaust-gas turbocharger (10).

14. A method for the testing of exhaust-gas turbochargers (10) in which a turbine (12) of the respective exhaust-gas turbocharger (10) is driven by means of compressed air, and the test being carried out with the inclusion of at least measurement quantities determined on the respective exhaust-gas turbocharger (10), comprising the steps of:
a) throttling the air on a delivery side (18) of the compressor (13);
b) using air which is under pressure to act upon an intake tract of an internal combustion engine driven in trailing mode;
c) increasing the pressure of the air which is under pressure in the internal combustion engine (11) driven in trailing mode; and
d) using the air of increased pressure which thereby emerges from the internal combustion engine (11) driven in trailing mode at an exhaust tract for driving the turbine (12) of the or each exhaust-gas turbocharger (10) to be tested,
wherein the boost pressure between the delivery side (18) of the compressor (13) and the throttle (20) is used as the measurement quantity of the compressor (13) which is to be determined.

15. The method as claimed in claim 14, characterized in that at least one throttle (20) is adapted at or downstream of the delivery side (16) of the compressor (13).

16. The method as claimed in claim 14, characterized in that the air is discharged into the surroundings downstream of the throttle (20) in the direction of flow.

17. The method as claimed in claim 14, characterized in that air, which is under pressure, from an external compressed air source (22) is used solely or additionally for driving the turbine (12) of the or each exhaust-gas turbocharger (10) to be tested.

18. The method as claimed in claim 14, characterized in that compressed air emerging at the exhaust tract of the internal combustion engine (11) driven in trailing mode is used for driving each exhaust-gas turbocharger (10) to be tested.

19. The method as claimed in claim 14, characterized in that measurement quantities of the compressor (13) are determined.

20. The method as claimed in claim 14, characterized in that, in addition to the boost pressure, the compressor mass airflow, the internal combustion engine mass airflow, the intake pressure of the internal combustion engine (11), the rotational speed of the exhaust-gas turbocharger (10), the rotational speed of the internal combustion engine (11) and/or the temperature of the air and/or of the oil are measured.

21. The method as claimed in claim 14, characterized in that a plurality of exhaust-gas turbochargers (10) assigned to the internal combustion engine (11) are tested simultaneously on the internal combustion engine (11) driven in trailing mode.

22. The method as claimed in claim 14, characterized in that the air which occurs on the exhaust gas side of the internal combustion engine (11) driven in trailing mode and is under pressure is used for driving the turbine (12) of the exhaust-gas turbocharger (10) to be tested in each case.

23. The method as claimed in claim 14, characterized in that air which is under pressure is supplied to an intake tract of the internal combustion engine (11), the pressure of the air sucked in by the internal combustion engine (11) is increased in the internal combustion engine (11) driven in trailing modes and the air which thereafter flows out of the respective exhaust tract of the internal combustion engine (11) and is under pressure is used for driving the turbine (12) of each exhaust-gas turbocharger (10) to be tested.

24. The method as claimed in claim 14, characterized in that the or each exhaust-gas turbocharger (10) is tested with that trailing internal combustion engine (11) to which the or each exhaust-gas turbocharger (10) is assigned during the subsequent operation of the internal combustion engine (11).

25. The method as claimed in claim 14, characterized in that characteristic values of the exhaust-gas turbocharger (10) to be tested in each case are determined from the measurement quantities determined during the cold test.

26. The method as claimed in claim 25, characterized in that the characteristic values of the respective exhaust-gas turbocharger (10) are determined from the ratios of the compressor mass airflow to the internal combustion engine mass airflow, the ratio of the boost pressure to the internal combustion engine mass airflow, the ratio of the compressor mass airflow to the rotational speed of the exhaust-gas turbocharger (10) and/or the ratio of the boost pressure to the rotational speed of the exhaust-gas turbocharger (10).

27. A method for the testing of exhaust-gas turbochargers (10) in which a turbine (12) of the respective exhaust-gas turbocharger (10) is driven by means of air which is under pressure, and the testing being carried out with the inclusion of measurement quantities on the compressor (13) of the respective exhaust-gas turbocharger (10), comprising the step of generating the pressure of the air which is under pressure at least partially by an internal combustion engine (11) driven in trailing mode, wherein the air, which is under pressure, is from an external compressed air source (22) and is used solely or additionally for driving the turbine (12) of the or each exhaust-gas turbocharger (10) to be tested.

28. The method as claimed in claim 27, characterized in that, in the internal combustion engine (11) driven in trailing mode, the air which occurs on the exhaust-gas side and is under pressure is used for driving the turbine (12) of the exhaust-gas turbocharger (10) to be tested in each case.

29. The method as claimed in claim 27, characterized in that air which is under pressure is supplied to an intake tract of the internal combustion engine (11), the pressure of the air sucked in by the internal combustion engine (11) is increased in the internal combustion engine (11) driven in trailing mode, and the air which thereafter flows out of the respective exhaust tract of the internal combustion engine (11) and is under pressure is used for driving the turbine (12) of each exhaust-gas turbocharger (10) to be tested.

30. The method as claimed in claim 27, characterized in that the or each exhaust-gas turbocharger (10) is tested by means of that trailing internal combustion engine (11) to which the or each exhaust-gas turbocharger (10) is assigned during the subsequent operation of the internal combustion engine (11).

31. The method as claimed in claim 27, characterized in that at least one throttle (20) is adapted on or downstream of a delivery side (18) of the compressor (13).

32. The method as claimed in claim 27, characterized in that the air is discharged into the surroundings downstream of the throttle (20), as seen in the direction of flow.

* * * * *